Aug. 22, 1961 H. C. STEARNS 2,997,102
FUEL SUPPLY SYSTEM FOR AUTOMOTIVE TYPE ENGINES
Filed Jan. 7, 1958 3 Sheets-Sheet 1

INVENTOR.
Harry C. Stearns
BY
Marles & French
Attys.

Aug. 22, 1961 H. C. STEARNS 2,997,102
FUEL SUPPLY SYSTEM FOR AUTOMOTIVE TYPE ENGINES
Filed Jan. 7, 1958 3 Sheets-Sheet 2
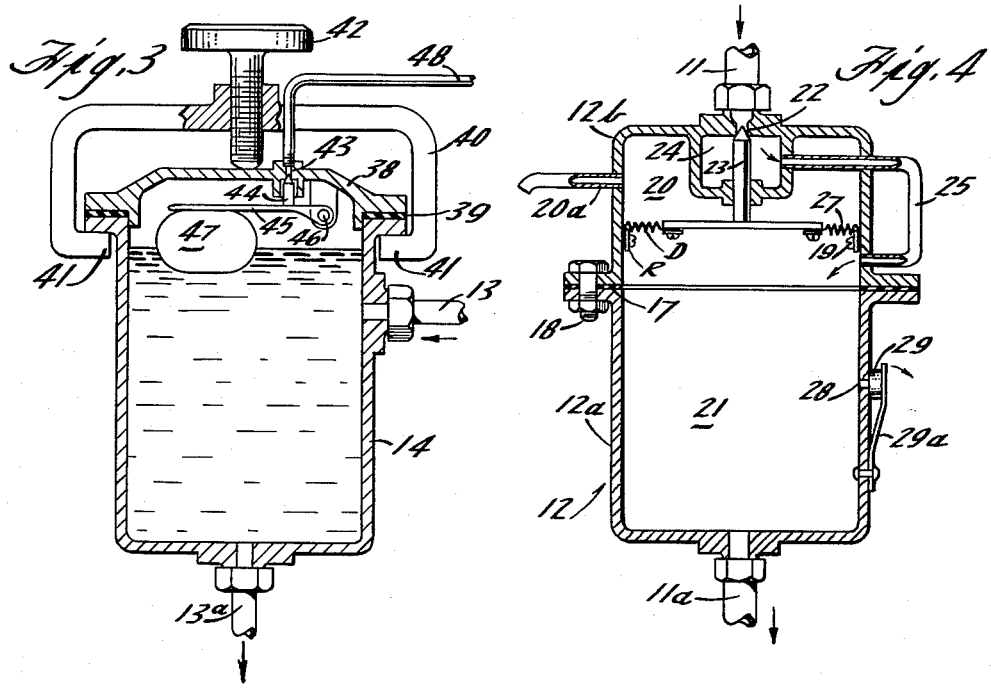
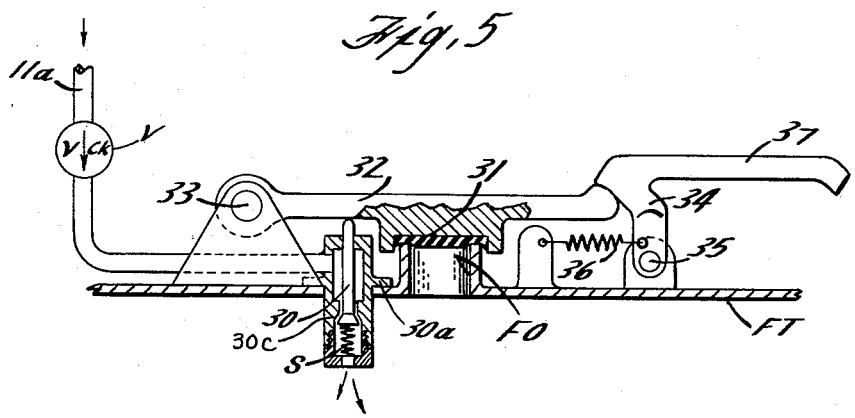
INVENTOR.
Harry C. Stearns
BY
Marles & French
Attys.

Aug. 22, 1961      H. C. STEARNS      2,997,102
FUEL SUPPLY SYSTEM FOR AUTOMOTIVE TYPE ENGINES
Filed Jan. 7, 1958      3 Sheets-Sheet 3
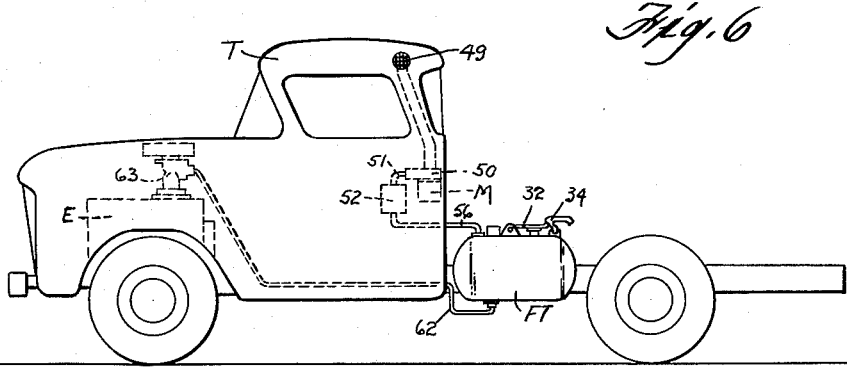
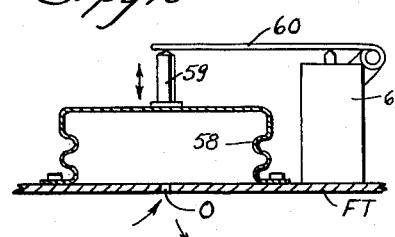
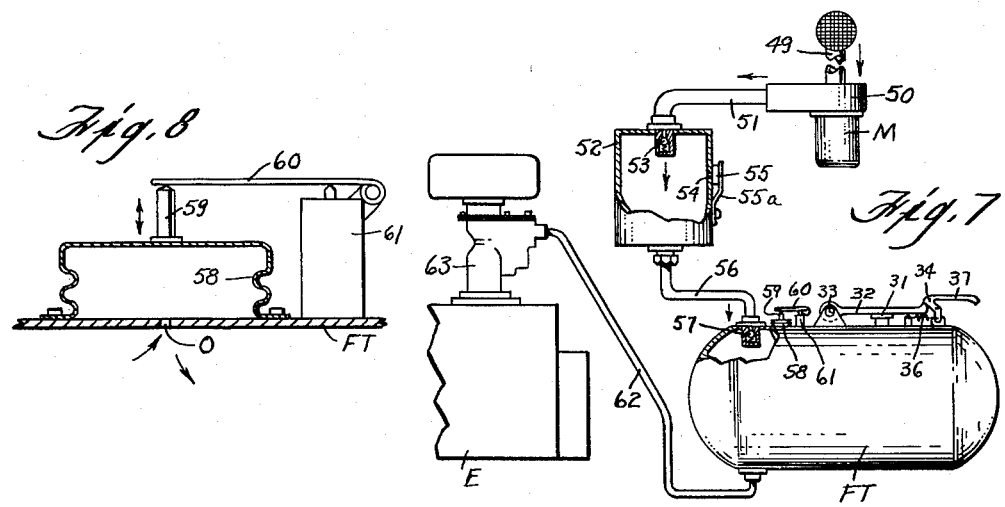
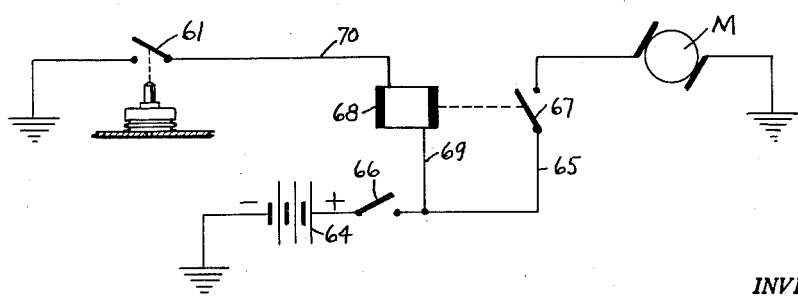
INVENTOR.
Harry C. Stearns
BY Quarles & French
Attys.

United States Patent Office 2,997,102
Patented Aug. 22, 1961

2,997,102
FUEL SUPPLY SYSTEM FOR AUTOMOTIVE TYPE ENGINES
Harry C. Stearns, 708 Prairie Ave., Glen Ellyn, Ill.
Filed Jan. 7, 1958, Ser. No. 707,645
3 Claims. (Cl. 158—36.5)

This invention relates to a method and means for minimizing vapor losses and vapor formations in fuel supply systems for supplying gasoline to carburetors of internal combustion engines which furnish motive power to trucks, tractors, pleasure cars and the like.

It has been conventional practice for many years in all pleasure cars and most trucks, to place fuel supply tanks considerably below and to the rear of the engines with some sort of constant atmospheric vent opening for such tanks. The ventilated tank arrangements permit the escape of vaporized fuel under most operating conditions and particularly when pavement heat, solar heat or warm days and low boiling-point ingredients are involved. This entails a needless loss of what is becoming a more and more expensive liquid whose price in this and other countries has been climbing appreciably from its original price at the time these tank arrangements were initiated and involves a liquid which has been and may again be very scarce, as in time of war or international crisis. The partial distillation which this arrangement permits also causes a gradual alteration of ingredients to change the functional characteristics of the residual as to easy starting and subsequent fuel metering in carburetors under some conditions.

The location of fuel supply tanks at elevations lower than motors or carburetors are accentuated when such vehicles climb hills and also entail the following problems of fuel transmission from the tank to the carburetor. The fact that the fuel flow is induced by creating a partial vacuum in the fuel feed pipe to permit the greater atmospheric pressure on the fuel in the tank to force fuel through the pipe into a vacuum tank or pump, at the engine, from which it is delivered into the carburetor bowl by gravity or pressure, is well known in the art. It is also well known that when the fuel is overly warm and/or contains low boiling-point ingredients generally present in freshly supplied gasoline, that this lowered pressure or partial vacuum causes gas effusion in the pump or vacuum tank which is often termed "fuel pump vapor-lock" or "vacuum tank vapor-lock" that often causes very inconvenient car or truck stalling, sometimes in very dangerous places, and also causes variations in liquid fuel supply to the carburetor under most operating conditions and which are very objectionable in conventional carburetor as will now be pointed out.

In practically all carburetors in use in the past forty years and particularly in the "plain tube types" gasoline has been supplied to the air stream through the carburetor, under idling or light load conditions, from a jet adjacent to the throttle valve at its closed position. As the throttle is opened, when the velocity through the body of the carburetor is sufficient to atomize fuel taken from a jet generally located in a venturi, this jet begins to feed fuel also, and as the throttle is opened further, this main jet takes over the entire supply of fuel. At the point of transition the desired overlap between the two supplies noted above is dependent to a large extent on the fuel level in the carburetor bowl as well as on vapor characteristics, viscosity, etc., on the fixed "air-bleed" and fuel ingredients, but the maintenance of a reasonably uniform and well located fuel level is essential. Thus when for example, a truck which has been traveling at high speed on a highway so that considerable heat has been developed under its hood, is required to stop for a town stop-light and then proceed through town at a slow speed, the high engine temperature, the under hood temperature and the lowered engine fan speed causes severe gas effusion in the vacuum fuel lead accompanied by low pump pressure at low engine speed causing the carburetor bowl fuel level to drop appreciably at a time when the carburetor is operating at the transition point of the jets. The result is rough performance, or stalling, and generally results in driver complaint and subsequent enlargement of the metering orifice supplying the main jet because it was thought that the engine could not get enough fuel through this jet, and subsequent to this under better operating conditions, the fuel pours through the needlessly large metering orifice with the resulting waste of precious fuel.

Fuel pumps in general use now in pleasure cars and trucks are mounted at the side of the engines, are cam driven from the engines, take in fuel by the creation of vacuum, and force same out under pressure into carburetors. These pumps deliver under pulsating pressure, and under pressure variations of nearly 20 p.s.i., developing approximately 2 p.s.i. at low engine speed and 20 p.s.i. at higher engine speed, which variations are very undesirable, and where carburetor bowl fuel levels are set at the lower pressures, may cause flooding or excessive flow at higher pressures.

For the reasons given above it will be apparent that vapor and/or gas of any nature moving with the liquid gasoline in the fuel line are undesirable, and that the fuel should be kept in liquid condition until it reaches the carburetor. Therefore, one object of the present invention is to provide a fuel supply system that holds the fuel under sufficient pressure through and during storage and delivery to the carburetor to prevent wasteful losses from the storage tank.

Another object of the present invention is to prevent alterations in the virgin fuel supply, to permit proper cold starting, and afford uniform vapor to atomized fuel proportions to be delivered from a carburetor.

Another object is to prevent intermittent and variable delivery of liquid fuel to a carburetor under a condition where the vehicle is operated on non-level ground, as in negotiating a hill.

Another object of the invention is to accomplish and maintain a closely uniform liquid fuel level in a carburetor, not possible when vapor formations occur in a supply line under most vacuum conditions, to obviate the undesirable conditions afore-described, particularly when vehicles are operating in the carburetor jet transition range previously described.

Another object is to prevent pulsating delivery of fuel to carburetors.

Another object is to prevent large pressure changes in fuel delivery to carburetors, as caused by present pumps.

The invention further consists in the several features hereinafter described and more particularly defined by claims at the conclusion hereof.

In the drawings:
FIG. 1 is a side elevation of a fuel system embodying the invention as applied to a tractor-truck having a compressed air supply;
FIG. 2 is an enlarged view of parts shown in FIG. 1;
FIG. 3 is a detailed vertical sectional view through an emergency fuel supply tank that may be used in the system;
FIG. 4 is a detailed vertical sectional view through a pressure regulating device used in the system;
FIG. 5 is a detailed vertical sectional view through a blow off and filler valve mechanism;
FIG. 6 is a view similar to FIG. 1 showing certain modifications;

FIG. 7 is a detailed view of these modifications, parts being broken away and parts being shown in section;

FIG. 8 is an enlarged detailed sectional view of a part shown in FIG. 7;

FIG. 9 is a circuit diagram.

Figure 1:
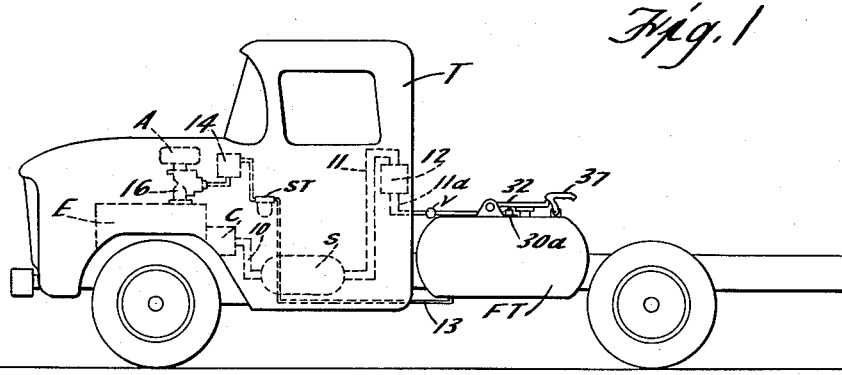
Figure 2:
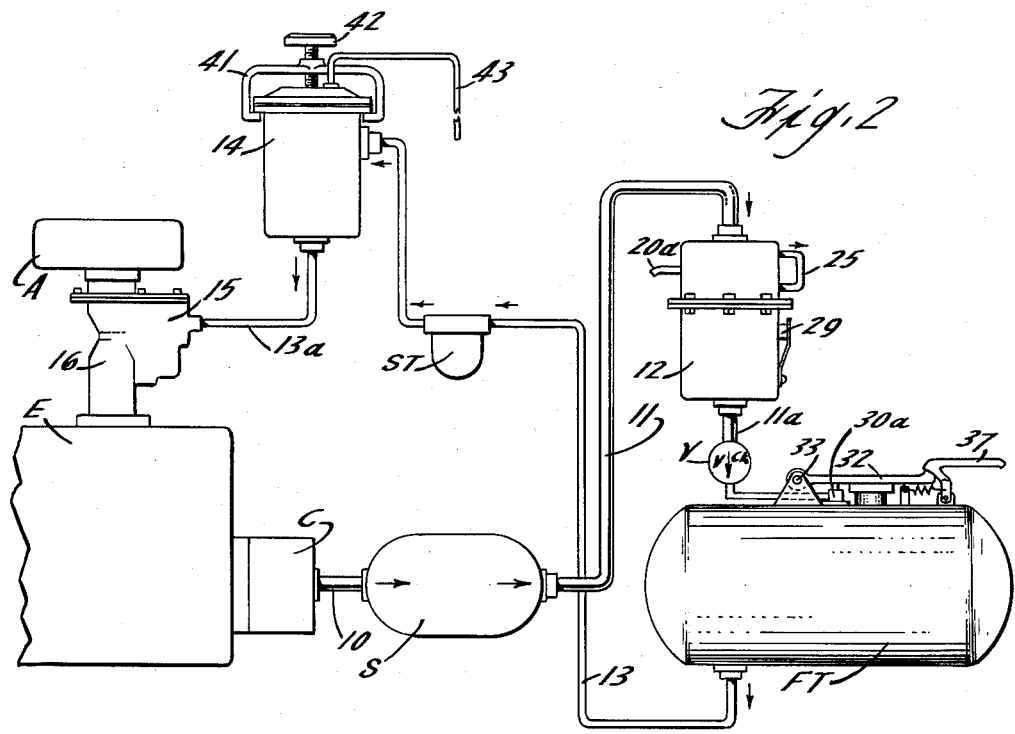

The system as shown in FIGS. 1 and 2 is representative of one that may be used where the automotive vehicle is initially equipped with a source of supply of compressed air. In the case of a motor driven truck this source of supply is one that is used to operate the air brakes for the truck. In the case of pleasure cars now being produced this source of supply is one that is used for the air-suspension of the vehicle.

In the case of a truck such as a trailer hauling truck T shown in FIG. 1, the engine E is equipped to drive a compressor C which through a pipe 10 supplies compressed air to a storage tank S from which it is piped with suitable controls to air brakes, not shown, and from which, as shown, a pipe 11 conveys it to the upper end of a pressure regulator device 12 from which air at the desired pressure is delivered to a pipe 11a having a check valve V therein past a then open valve 30 to the upper portion of a fuel tank FT to force fuel therefrom through a pipe 13 including a strainer ST to an auxiliary tank 14 from which through a pipe 13a it is delivered to a conventionally illustrated downdraft carburetor 15 including a mixing passage 16 connected at its upper end to an air cleaner A and at its lower end to intake manifold (not shown in detail) of the engine E. The carburetor 15 may preferably be equipped with the lock-out for the needle valve to its float chamber following my prior U.S. Patent No. 2,801,623, dated August 6, 1957.

Referring to FIG. 4, the regulator device 12 includes a tank made up of two sections 12a and 12b joined together by a gasket 17 and bolts 18. The section 12a has a flexible diaphragm D mounted therein as by a clamping ring R and screws 19 that divides the interior of the tank into compartment 20 and a pressure balance chamber 21. The compartment 20 has an atmospheric vent passage 20a. To provide for the desired reduction in pressure from that of the air in the storage tank S which may be from 120 to 200 p.s.i., the inlet end of the tank is provided with a restricted opening forming a valve seat 22 that cooperates with a needle valve 23 mounted on the central portion of the diaphragm D to admit air into an inlet compartment 24 which is connected by a conduit 25 with the chamber 21. The pressure of the air in the chamber 21 acting on the diaphragm D and through it on the needle 23 brings the pressure of the air in the chamber 21 to the desired lower pressure, for example, twenty pounds per square inch gauge. The flexible portion 27 of the diaphragm may be any suitable laminated and fluted rubber composition or fabric and rubber composition or a suitable metal composition. The chamber 21 is preferably provided with a safety outlet 28 normally closed by relief valve 29 held closed by a spring 29a.

The outlet end portion of the pipe 11a where it connects with the fuel tank FT has a check valve V mounted therein to shut off the fuel tank from the air chamber to prevent back-flow of gas from tank FT under any condition where pressure in chamber 21 drops below the pressure in the tank FT.

The fuel tank FT is provided with a filling opening FO normally closed by a neoprene or other suitably gasketed flap valve 31 carried by a lever 32 pivotally mounted at 33 on the top of said tank and latched closed by a latch 34 engaging its outer end and pivotally mounted at 35 on the tank and normally urged to latched position by a spring 36, the latch having an operating handle 37. This latched structure also acts as a safety relief valve for the fuel tank, the spring 36 being suitably calibrated for this purpose. Release of the latch 34 from lever 32 permits the valve 31 to be raised so that the tank may be charged with fuel.

In order to prevent loss of pressure air in storage system when the tank FT is opened for filling, the valve 30 is mounted in a fitting 30a connected with the pipe 11a and normally urged to a closed position on its seat 30c by a spring S. The stem of valve 30 projects through its housing into contact with the lever 32 which holds it open as shown in FIG. 5 when the valve 31 is closed. On the movement of lever 32 to open the valve 31, said lever is released from the valve 30 to permit it to close the same against the air pressure in the pipe 11a.

In those forms of air supply where the storage tank during engine operation is always filled with air at the desired pressure, the fuel pipe 13 can be direct connected to the carburetor 15, but where through prolonged engine stoppage or other reasons the pressure in the storage tank S would be low, then the auxiliary tank 14 is provided.

Referring to FIG. 3, the auxiliary tank 14 is arranged in circuit with the fuel supply line 13 and the line 13a leading from the bottom of said tank to the carburetor 15. The tank may be of a size to receive a half gallon of gasoline. It has a removable cover 38 secured with a sealing gasket 39 to its upper end by any suitable clamping means such as, for example, a U-shaped clamping member 40 whose inturned legs 41 engage the underside of the top flange of the tank and whose medial portion carries a clamping screw 42 that engages the top of said cover. The cover has an air bleed orifice 43 controlled by a needle 44 carried by a lever 45 pivotally supported at 46 from the cover and carrying a float 47. When the tank 14 is full, the float controlled lever 45 is moved upwardly by the fuel in the tank so that the needle 44 closes the orifice 43, but as fuel is used up from tank 14 before the air pressure is built up by the engine in the storage tank S as in some cases of engine starting when the air pressure has dropped, the float lever may drop to a point at which the orifice 43 is open to relieve any vacuum in the tank that might otherwise occur. Since there may be some fuel spillage through the orifice 43, a flexible pipe 48 connects with the outlet side of this orifice and leads down to a place of drainage. Before the fuel is used up by the engine's receiving fuel therefrom, enough pressure will have been developed by the engine's drive of the compressor C to bring the air in the tank S to the desired operating pressure so that the air under the desired pressure will be delivered to the tank 21 and from thence past the valve 30 to the upper portion of the fuel tank FT so that fuel will be forced therefrom through the supply line 13 to the tank 14 to fill and keep this tank charged and consequently the orifice 43 closed thereafter, and fuel will also pass from this tank 14 to the carburetor 15 at the desired pressure, it being noted that a pressure of 20 p.s.i. is more than sufficient to prevent any objectionable vapor pressure building up in the fuel in the tank FT or its delivery lines that might otherwise occur due to the tank becoming heated or the vehicle demanding a full fuel supply when negotiating a hill.

Should the reserve supply of fuel normally stored at all times in the tank 14 be used up in starting, before engine starts, or before it builds up sufficient air pressure to refill tank 14, the hand screw 41 permits easy opening of cover 40 to refill from a convenient safety can.

Where the vehicle does not have a source of compressed air available, then the apparatus shown in FIGS. 6 to 9 can be used. In this instance the truck tractor vehicle T has an air intake 49 mounted in its cab and connected with a compressor 50, here shown as of the blower type, though it may be of the vane pump type, direct connected to an electric motor M. A discharge pipe 51 from the compressor connects to the upper end of air pressure tank 52, there being an air operated spring check valve 53 mounted at the inlet to said tank. This tank similar to the tank 12 may have a safety outlet 54 normally closed by a relief valve 55 mounted on the free end of a closing spring 55a. A pipe 56 connects the lower end of this tank with the upper end of the fuel tank which is identical with the tank FT and similarly numeralled and provided with the identical form of filling opening and pressure relief means shown in FIG. 5 and therefore similarly numeralled, but in this instance the valve 30 is not necessary so that the pipe 56 connects directly with the tank, and a spring closed check valve 57 is mounted at the inlet end of the tank. In addition the tank FT is provided with an opening O communicating with a diaphragm 58 mounted in the top of the tank and carrying a pin 59 adapted to engage a spring loaded actuator 60 of a control switch 61 to operate the same.

The lower end of the tank connects by a pipe 62 with the fuel inlet for a carburetor 63 similar to the carburetor 15 for supplying fuel to the engine E. The motor M is in circuit with a battery 64 through a conductor 65 including a hand or starting switch 66 and a relay or solenoid operated switch 67, one side of the battery and one side of the motor being grounded. The coil 68 of the relay is connected at one end by a conductor 69 to the conductor 65 and at its other end to a grounded conductor 70 that includes the normally open switch 61 held closed by the actuator 60.

For years, most automotive vehicles have been equipped with keyed engine starting switches, which when turned in one direction permit the functioning of certain accessories, and when turned in the other direction control engine starting and running. With the electric motor operated blower, for pressurizing fuel systems, the blower may be connected to the accessory circuit, so that by turning to this before turning to engine start, fuel pressurizing will always be established before starting engine. In that case tank 14 would not be needed.

With this construction, the closing of the switch 66 starts the motor, the switch 67 being then closed since the switch 61 is then closed and the coil 68 of the relay is energized. The compressor 50 is then operated to deliver air under pressure through the pipe 51 past the valve 53 to the tank 52 and thence through the pipe 56 past the valve 57 to the upper portion of the tank FT putting pressure on the fuel therein and forcing it through the pipe 62 to the carburetor 63. When the maximum desired air pressure of the fuel in the tank FT is obtained, which pressure is above any vaporizing pressure of the fuel and may be twelve pounds per square inch gauge or higher (in which instance a vane type pump may be used) the diaphragm 58 loaded by the spring loaded actuator 60 will expand sufficiently to cause the pin 59 to lift the actuator 60 from the switch 61 to allow this switch to open and deenergize the coil 68 so that the motor switch 67 is opened to stop the motor.

The sealing against any loss of vapor when the engine and pump are not running is accomplished by the check valves 53 and 57 and the carburetor float valve lock of my Patent No. 2,801,623, not shown herein.

With the above constructions as the high pressures to which the fuel in the fuel tank is subjected are sufficient to prevent the development in the fuel tank of vapor pressures causing "vapor-lock" that might occur under conditions encountered in the running of the engine, and also there is always sufficient fuel pressure feed available to insure the feeding of fuel to the carburetor when the vehicle is traveling up hill.

I desire it to be understood that this invention is not to be limited to any particular form or arrangement of parts except in so far as such limitations are included in the appended claims.

What I claim as my invention is:

1. In a fuel supply system for carburetor type internal combustion engines for automotive vehicles, the combination with a fuel supply tank, a carburetor, and fuel supply connections between said tank and said carburetor, of means for automatically supplying and regulating air under pressure to the upper portion of the tank to subject the fuel therein to a feeding pressure above atmospheric pressure and at a preselected, substantially constant pressure that will prevent the fuel therein from vaporizing under conditions encountered in the running of the vehicle, said air supply means including an electric motor, a compressor driven by said motor, a pressure tank, a source of current supply for said motor; means controlled by the air pressure within said fuel supply tank to control the supply of current to said motor; and check valve means interposed between said pressure tank and said supply tank wherein the air pressure in said supply tank may be maintained and be readily available within the desired operating pressure range.

2. In a fuel supply system for carburetor type internal combustion engines for automotive vehicles, the combination with a fuel supply tank, a carburetor, and fuel supply connections between said tank and said carburetor, of means for automatically supplying and regulating air under pressure to the upper portion of the tank to subject the fuel therein to a feeding pressure above atmospheric pressure and at a preselected, substantially constant pressure that will prevent the fuel therein from vaporizing under conditions encountered in the running of the vehicle; said air supply means including an engine driven compressor, a storage tank, and means for supplying air from said storage tank to the fuel supply tank at a lower pressure than that of the air in said storage tank; said fuel supply tank having a filling opening, a valve to close said opening, means for controlling said valve, and normally open valve means communicating with said air supply means and arranged for shutting off the supply of air to said fuel tank upon opening of said valve and being automatically controlled by the means for controlling said first named valve.

3. In a fuel supply system for carburetor type internal combustion engines for automotive vehicles, the combination with a fuel supply tank, a carburetor, and fuel supply connections between said tank and said carburetor, of means for automatically supplying and regulating air under pressure to the upper portion of the tank to subject the fuel therein to a feeding pressure above atmospheric pressure and at a preselected, substantially constant pressure that will prevent the fuel therein from vaporizing under conditions encountered in the running of the vehicle, said air supply means including an electric motor, an electrical current supply circuit for said motor comprising a relay-operated motor switch and a second switch controlling the circuit to the coil of the relay-operated switch, a compressor driven by said motor, a pressure tank communicating with said compressor and with said fuel supply tank, a flexible diaphragm actuated by the air pressure within said fuel supply tank and being in operative relation with said second switch, and check valve means interposed between said pressure tank and said supply tank wherein the air pressure in said supply tank may be maintained and be readily available within the desired operating pressure range.

References Cited in the file of this patent

UNITED STATES PATENTS

| | | |
|---|---|---|
| 399,548 | Nageldinger | Mar. 12, 1889 |
| 1,250,552 | Bruckner | Dec. 18, 1917 |
| 1,338,965 | Ryckman | May 4, 1920 |
| 1,419,553 | Galloway | June 13, 1922 |
| 1,712,877 | Ehlers | May 14, 1929 |
| 1,918,807 | Glab | July 18, 1933 |
| 1,973,258 | Jensen | Sept. 11, 1934 |
| 2,121,596 | Hill | June 21, 1938 |
| 2,349,137 | Brown | May 16, 1944 |
| 2,424,440 | Duffy | July 22, 1947 |
| 2,601,757 | Horton | July 1, 1952 |

FOREIGN PATENTS

| | | |
|---|---|---|
| 740,717 | France | Nov. 21, 1932 |